United States Patent [19]
D'Antonio et al.

[11] Patent Number: 6,123,093
[45] Date of Patent: Sep. 26, 2000

[54] SYSTEM FOR CONTROLLING FLUID FLOW

[75] Inventors: Nicholas F. D'Antonio, Liverpool, N.Y.; Robert Giggey, Barrington, R.I.; Richard O. Colvin, Baldwinsville, N.Y.

[73] Assignee: D'Antonio Consultants International, Inc., East Syracuse, N.Y.

[21] Appl. No.: 09/070,410

[22] Filed: Apr. 30, 1998

[51] Int. Cl.[7] .................................................. A01G 25/16
[52] U.S. Cl. ...................... 137/78.3; 137/80; 137/68.13; 137/554; 251/30.01; 251/71; 251/67
[58] Field of Search .............................. 137/78.3, 79, 80, 137/554, 357, 360, 68.13; 251/67, 71, 129.04, 62, 30.01, 30.05; 239/64

[56] References Cited

U.S. PATENT DOCUMENTS

| | | |
|---|---|---|
| 3,995,186 | 11/1976 | Kaminsky et al. . |
| 4,098,284 | 7/1978 | Yamada . |
| 4,232,736 | 11/1980 | Pillett . |
| 4,297,686 | 10/1981 | Tom . |
| 4,305,420 | 12/1981 | Nussdorf . |
| 4,545,396 | 10/1985 | Miller et al. . |
| 4,684,920 | 8/1987 | Reiter . |
| 4,687,625 | 8/1987 | Hasegawa et al. . |
| 4,693,419 | 9/1987 | Weintraub et al. . |
| 4,787,410 | 11/1988 | Fujieda et al. . |
| 4,790,514 | 12/1988 | Marks . |
| 4,838,763 | 6/1989 | Krämer et al. . |
| 4,845,472 | 7/1989 | Gordon et al. . |
| 4,847,599 | 7/1989 | Imiolex et al. . |
| 4,892,113 | 1/1990 | Fattahi . |
| 4,921,001 | 5/1990 | Pittsinger . |
| 4,969,482 | 11/1990 | Perrin et al. . |
| 4,974,624 | 12/1990 | Gotanda . |
| 5,040,409 | 8/1991 | Kiewit . |
| 5,060,859 | 10/1991 | Bancroft . |
| 5,090,436 | 2/1992 | Hoch, Jr. et al. . |
| 5,126,934 | 6/1992 | MacFadyen . |
| 5,139,044 | 8/1992 | Otten et al. . |
| 5,148,826 | 9/1992 | Bakhshaei . |
| 5,240,022 | 8/1993 | Franklin . |
| 5,334,973 | 8/1994 | Furr . |
| 5,337,957 | 8/1994 | Olson . |
| 5,347,264 | 9/1994 | Bjorkman . |
| 5,357,241 | 10/1994 | Welch, Jr. et al. . |
| 5,409,037 | 4/1995 | Wheeler et al. . |
| 5,419,358 | 5/1995 | Sun . |

OTHER PUBLICATIONS

Cole–Parmer Instrument Company, "Water Alarms," catalogue p. 20.

Cole Parmer Instrument Company, "New 4 to 20 mA Input Voice Monitor," catalogue p. 23.

Cole Parmer Instrument Company, "New Surface–Mount Wireless Temperature Alarm," catalogue p. 21.

Q.P. & H Manufacturing brochure: *Introducing the Revolutionary Water Gate System*.

Midland International Corporation product sheet, "Model 72–310 Remote Control DC Power Switch System," Nov., 1989.

*Primary Examiner*—A. Michael Chambers
*Attorney, Agent, or Firm*—D. Peter Hochberg; William H. Holt

[57] ABSTRACT

A system for regulating flow of fluid through a flow line, such as a supply line, the line having a flow controller such as a valve, the system having a sensor for generating a signal in response to a parameter, a transmitter for transmitting a corresponding signal to a receiver at a remote location, a receiver for receiving the signal from the transmitter, an actuator for operating a regulator in response to the signal received by the actuator for operating the valve or other flow regulator.

61 Claims, 5 Drawing Sheets

SYSTEM FOR CONTROLLING FLUID FLOW

BACKGROUND OF THE INVENTION

1. Field of the Invention

The present invention relates generally to the regulation of the flow of fluid through at least one fluid flow line having flow control apparatus according to a parameter sensed at a location remote from the apparatus. One aspect of the invention particularly relates to the shutting off of a supply line when a dangerous condition exits.

2. Description of the Prior Art

The value and importance of supply line cut-off for dangerous situations are significant. Responses to dangerous situations involving the flow of water, other fluids and gases through supply lines that depend on an audible alarm are totally ineffective when rapid reaction is needed, or when no one is available to correct the situation. Telephone line warnings are no better if the call is undetected, or if people are too far away to take corrective action. Therefore, the need for automatic supply line cut-off systems is very important in compensating for detected dangerous conditions.

Prior art devices come in several forms. Solenoid driven valve systems are fast, but require the cutting of a supply line to install the device. In most cases, this will require a professional plumber for installation, and can become very expensive to install and repair. Most non-intrusive valve shut-off systems require the use of electric motors. Electric motors require a great deal of electrical current to operate, and most systems require a source that can supply a high amount of power. Power also is required to operate the continuously operating control circuitry of the non-intrusive system. If a battery is used, the control circuitry will use the power from the battery, and in some cases not leave enough power for the motor to adequately drive a valve closed when a closure signal is received. Therefore, an AC power source or some other continuous source must be available to power the control circuit, the motor, or continuously recharge a battery. This limits the devices to areas where a continuous power source is available. Further, electric motor operated systems usually require limit switches or position sensors to tell a motor when to stop. This requires extra components and extra control circuitry for monitoring the device.

Supply line cut-off systems require some method of sensing a dangerous condition. Most of these sensor types are local devices that are hardwired to a control circuit for detecting a dangerous condition. In the few cases where remote sensors are used they are hardwired. This requires that wiring be run through floors, ceilings and walls to be connected to the control circuitry for detecting and shutting off one or more valves. A broken wire may be detected as a dangerous condition and perform an unnecessary shutdown. Worse yet, a dangerous condition may not be detected at all, because the control circuit does not receive a required dangerous condition signal.

Sensor types from the prior art devices include those responsive to flow, pressure, temperature, moisture, gas detection and other measurable parameters. The majority of these systems allow for using only one type of sensor in their system, which leaves other dangerous conditions undetectable. A consumer must choose between what is thought to be the most dangerous parameter to measure. Further, consumers must purchase different systems for detecting different types of dangerous parameters and controlling the shut off of different types of supply lines.

The current invention solves these problems of the prior art by providing a non-intrusive system with low power requirements. The system allows for the use of several different types of sensors for simultaneously detecting a variety of parameters. Additionally, the system can be used on a variety of supply lines and require minimal connection wiring or no connection wires at all. Further, preferred embodiments of the system eliminate the need for limit switches or position sensors associated with the use of electric motors, and the additional circuitry necessary for controlling and monitoring those sensors.

The supply line cut-off described above is part of a more general flow control system where the flow is regulated. "Regulate" as used herein means to activate or terminate fluid flow, or to control the flow with respect to its volume (such as by altering a valve opening) and/or controlling the pulsing of fluid flow.

Another area for controlling fluid flow relates to watering vegetation, such as vegetable plants, lawns, and the like. Presently, such systems which are automated involve applying a preset amount of water at given times. Hence, excessive water could be applied during wet weather, and inadequate water would be applied during dry weather. The inventor is unaware of a system which controls the watering of vegetation according to the saturation of the soil in which the vegetation is growing.

There has not previously existed an inexpensive yet effective apparatus for monitoring some characteristic relating to the flow or supply of fluid and for controlling the regulation of the fluid flow according to such characteristic. These characteristics include the supply line for the fluid (such as the flow of water to a building), the flow of fluid in industrial processes, and the supply of water for vegetation, and the like.

SUMMARY OF THE INVENTION

The invention in one of its preferred forms is a low cost system for rapid supply line closure, which is actuated when an undesirable agent is detected or when an electrical failure is detected which could lead to a loss of heat, or to avoid the risk of freezing pipes carrying water or other liquids susceptible of becoming solid under cold conditions. A temperature dependent valve opening apparatus for system drainage is also included in the preferred embodiment. The cut-off procedure is achieved with sensors that detect the agent or other parameter, a responsive radio frequency (RF) transmitter for the indicative transmission of signals and a non-electrical spring motor, a gas source or ignitable powder for actuating a valve, wherein any of these non-electric power sources provide a near instantaneous motion that will close a valve in the supply line. For a battery-operated system, the spring motor, gas source, or powder allow for a smaller, less expensive, lower capacity, yet longer life battery in which the valve can also be closed as a safety precaution if a low battery warning is ignored for a predetermined period of time.

A battery driven gear motor can also be used for closure or opening the supply line but would be more expensive and slower acting unless the motor/battery combination were considerably more powerful. The valve closure methods disclosed also avoid the need for force or position sensors to tell the motor when to stop and reduce concern for battery life because of excessive steady state drain. Reduced costs because of self-installation are an important advantage. This invention provides protection at an economical cost whether the user is or is not present during its operation.

The system in a preferred form is for shutting off a supply line and comprises wireless sensor means for detecting an undesirable parameter at a remote location, transmitter means for transmitting a closure signal from the remote location, the transmitter means being responsive to the sensor means, receiver means for receiving the closure signal from the transmitter means, and motor actuator means responsive to closure signals for controlling a motor, the motor being connected to a valve for shutting off and, in the case of an electric motor or gas operated valve, opening the supply line as well.

The invention in its preferred form further uses a non-electrical flow control means such as closure means for turning off a supply line valve, and comprises spring, gas or ignitable powder means for providing a torque or force to the valve means for amplifying the torque or force of the closure means, a plate for affixing the gear means to the valve, and in the case of the spring motor, winding means for winding the spring means, locking means for holding the spring means in a wound state, and trigger means for receiving a closure signal and releasing the spring from the wound state, causing the gears to rotate and apply torque to actuate the valve. In the case of the gas or powder means for closure, a pulse of energy to the closure actuator releases the gas or ignites the powder to close the valve.

Another preferred embodiment relates to the watering of vegetation, such as watering lawns. One or more sensors determine a parameter indicative of the water needs of the lawn or other vegetation, such as a specified saturation point in the ground, and regulates the flow of water to the vegetation. The regulation can include activating or terminating the flow of water, regulating the amount of water supplied, the pulse rate or amount of water pulsed, and the like.

An object of the present invention is to provide a versatile, low cost supply line cut-off system.

Another object of the present invention is to provide a non-invasive supply line cut-off system that is easy to install by a consumer without the need of a professional plumber.

A further object of the present invention is to provide a wireless supply line system for rapid supply line closure when an undesirable condition is detected, or if an electrical failure could lead to a change of the temperature conditions which could cause a dangerous change of state of a fluid flowing through the system.

Another object of the present invention is to provide a temperature dependent valve opening apparatus for system drainage.

A further object of the present invention is to provide a supply line cut-off system that eliminates the need for force or position sensors for effecting the stopping of a motor after the motor has closed a shut-off valve.

It is a further object to provide an effective watering system for vegetation, for measuring a parameter indicative of the amount of water required by the vegetation, and regulating the flow of water accordingly.

Still another object of the present invention is to provide a small battery operated, inexpensive system that provides for a long battery life or can be used with AC operation and battery back-up if AC power is available.

A general object of the invention is to automatically regulate the flow of a fluid according to a parameter reflective of the factor(s) according to which the flow is to be regulated, where the parameter is sensed by sensors remote from the means for regulating the flow.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENTS

Figure 1:
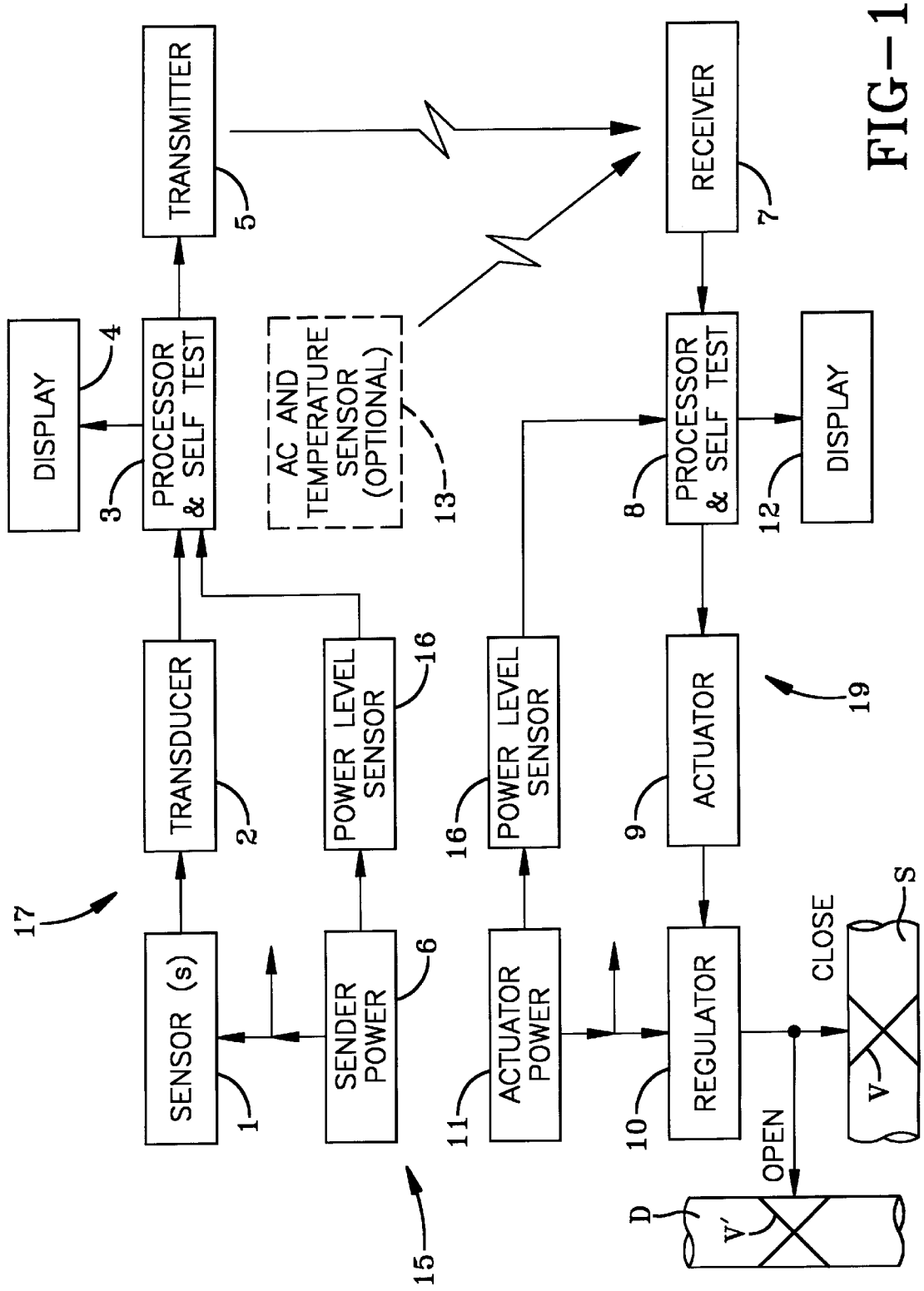
FIG. 1 is a block diagram of a system according to the invention.

Referring now to the drawings wherein the showings are for the purpose of illustrating the preferred embodiments of the invention only, and not for purpose of limiting same, FIG. 1 shows functional blocks comprising a system 15. System 15 includes a sensing and transmitting system 17 and a receiving and regulating system 19. Sensing and transmitting system 17 is located at a detection site, and is remote from receiving and regulating system 19. Sensing and transmitting system 17 includes at least one sensor 1 connected to a sender power device 6 and a power level sensor 16. Sensor 1 is electrically connected to a transducer 2 which provides a useful signal to a sender processor and self-test function 3 to which it is electrically connected. Sender processor 3 interfaces with a display 4 and a transmitter 5. Transmitter 5 sends a signal to receiving and regulating system 19 when a parameter (such as the presence of, temperature of, composition of, pressure of, saturation of, etc., liquid, gas or other materials) indicating an undesirable characteristic is detected by sensing and transmitting system 17. Receiving and regulating system 19 includes a receiver 7 for receiving a signal from the sensing and transmitting system 17. A receiver processor and self-test function 8 interfaces with receiver 7 and a display 12. Receiver processor 8 cooperates with an actuator 9 to send a drive signal to a regulator 10, which can be a closure, closure/opening, fluid pulsating, or valve means. An actuator power device 11 also has a power level sensor 16 and is connected to regulator 10. Regulator 10 operates a valve V in a supply line S for (in this example) closing supply line S. If regulator 10 is an electric motor for closing valve V, it can also be reversed to open valve V. An optional AC and temperature sensor block 13 may be included in system 15 for transmitting an AC off signal to receiving and regulating system 19 to close valve V in supply line S and open valve V' in drain line D. The preferred embodiment uses a sensing and transmitting system 17 for each location of sensor(s) and a receiving and regulating system 19 for each regulator.

By way of example, the system is described for shutting off water supply lines of a building. Referring to the cooperation and operation of the functional components, FIG. 1 shows one or more sensing devices, sensors or sensing modules 1, that provide a signal representative of an undesirable parameter variation when an unwanted condition or conditions occur. The variable parameter can cause changes in an electrical resistance, inductance, capacitance, radiant energy, sound or ultrasound, and provides the source for generating a useful signal in response to an unwanted condition, which is transmitted to a transducer 2. Each sensor module can be powered by its own battery, or by AC grid power if available, and have an optional battery back-up to emit the cut-off and/or opening signal, if predetermined low temperatures occur when AC power is lost. For a totally battery powered system, AC and temperature sensor 13 can be supplied as a plug-in accessory to sense the loss of AC power and emit a hazard signal to cut off the supply line valve V and open valve V' in drain line D for situations where an existing heating system is no longer functional and freezing temperatures exist.

Other features could include a sensor override since water may be needed regardless of other factors if smoke is detected. Also, an audible and/or visual warning can be issued when sensor 1 is activated. Although the system is described by way of example for shutting off of water supply lines of a building, the system may be useful for any type of detectable gas, fluid, or moisture, and can even detect excessive flow rates or pressure drops commensurate with burst supply lines. Low profile, broad based sensors can be used to avoid the risk of the sensors falling on their side. This would very likely prevent the sensor input from coming in contact with a surface where a deleterious fluid or moisture might be present. This, of course, is not a problem associated with a sensor concerned with gas detection. Examples of the dangerous gases that can most likely be detected with the inventive system are carbon monoxide, natural gas, propane, motor fuel fumes, and other toxic or explosive substances.

Transducer 2 cooperates with sensor(s) 1, and provides a useful signal to the signal processor and self-test function 3. Display 4 is optional and can be connected to signal processor 3 to provide useful visual information about system status, such as where and when a problem causing agent is detected and the nature of that agent. It can also provide visual information along with an audible signal for indicating a low battery condition. An audible signal and/or a blinking LED at the sensor can also be included to identify which sensor went off. These features could help avoid a lengthy and/or complicated inspection for a multi-sensor installation.

Sensing and transmitting system 17 may transmit a coded or uncoded signal. For some RF applications, the Federal Communications Commission (FCC) requires that a coded signal, such as that used in garage door openers or auto locks, be used for higher power transmitters to prevent interference with other RF devices, but in either a coded or uncoded signal system, a valid signal is needed to activate receiving and regulating system 19. Depending on the application, more than one system format for signal transmission may be needed, i.e., the least expensive for short distances such as in a standard residence, or a more powerful, coded transmitter for greater distances. For systems containing sensors for detecting more than one substance, different codes can also be used to dictate which valves are closed and/or opened. Other ways one might transmit the cut-off signal from the sensor to a receiver/actuator are coupling into the AC lines, light or IR beams when no form of obstruction is possible, coded vibration or ultrasound signals on the water pipes, coded audible output and audible decoders, or hardwiring system elements. For power conservation with battery operation, transmitter 5 is only actuated when the agent is detected and a pulsed signal is transmitted. Once the hazard is detected, this signal is repeated to ensure that it reaches receiver 7 which also comes on periodically for short intervals to see if a valid signal is present. Sender power 6 is preferably comprised of a battery at each sensor/sender location unless central power is available. Standard or rechargeable batteries can be used. A storage capacitor, solar charger and a minimal back-up battery are also possible.

In order to conserve power with battery operation, receiver 7 only comes on periodically to see if a signal is present, and will respond if a valid frequency and code are detected. If receiver processor and test function 8 determine the transmitted signal is valid, closure will follow. The closure signal triggers closure actuator 9, which can be an electromechanical device for actuating a spring motor, or to provide power for energizing an electric motor.

Regulator means 10 could be a spring, a device actuated by pressurized gas or ignitable powder, or electrically powered, but in each case it serves to close the valve in supply line S and/or close the valve in drain line D. If a spring motor is used, spring motion is geared down to provide a greater closure force, especially when actuating very stiff valves often found in natural or propane gas lines. The same type of spring or electric motor, normally used in reverse to close a valve, may be used to open an existing drainage valve for applications where large volumes of stored water pose an additional leakage risk to a building. The receiver power may also be comprised of a battery at the receiver location unless central power is available. The processor may include a display 12 and performance functions similar to display 4 found in sensor and transmitting system 17.

The user normally resets the system; however, with electric motor closure, the line can be automatically reopened when the temperature increases by simply reversing motor direction. A gear box is normally used with the small, low torque electric motor. Since a small, geared-down motor will require a relatively small amount of current, this procedure is possible even if the unit is battery operated. If supply line water is needed in spite of a leak, sensor 1 is preferably of the type which can be bypassed and valve V manually reset. The system can include a self-test feature shown in function 3, where the processor periodically emits a properly coded signal. If the test signal does not appear at receiver 7 within a designated period of time, an audible signal is emitted to warn the user of a possible system malfunction.

Figure 2:
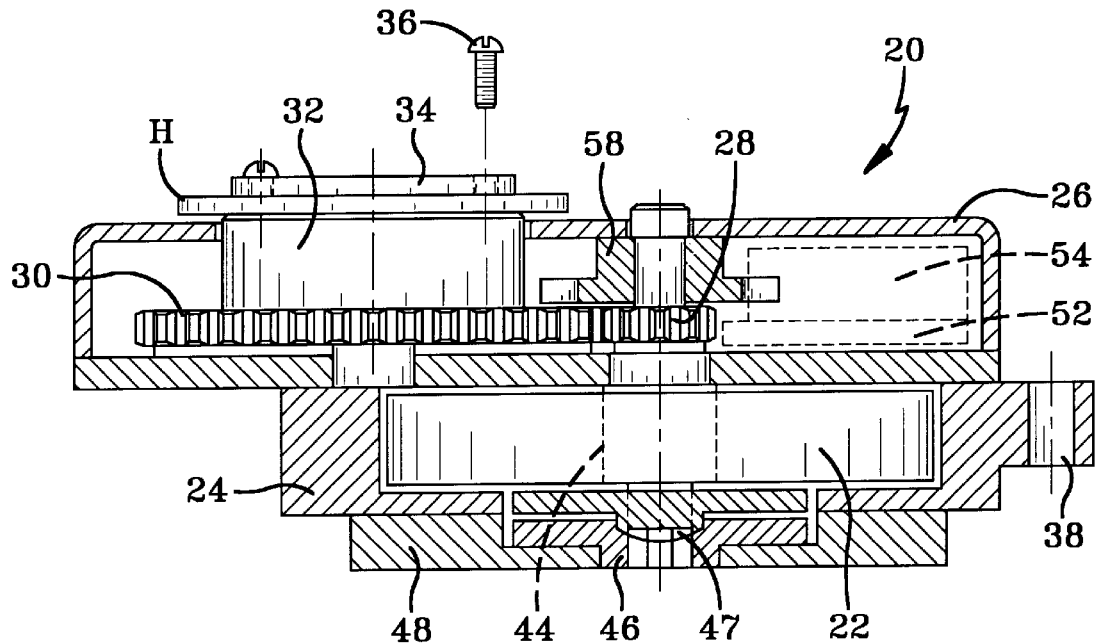
FIG. 2 is a side view of a spring motor power unit pursuant to an embodiment of the invention.
Figure 3:
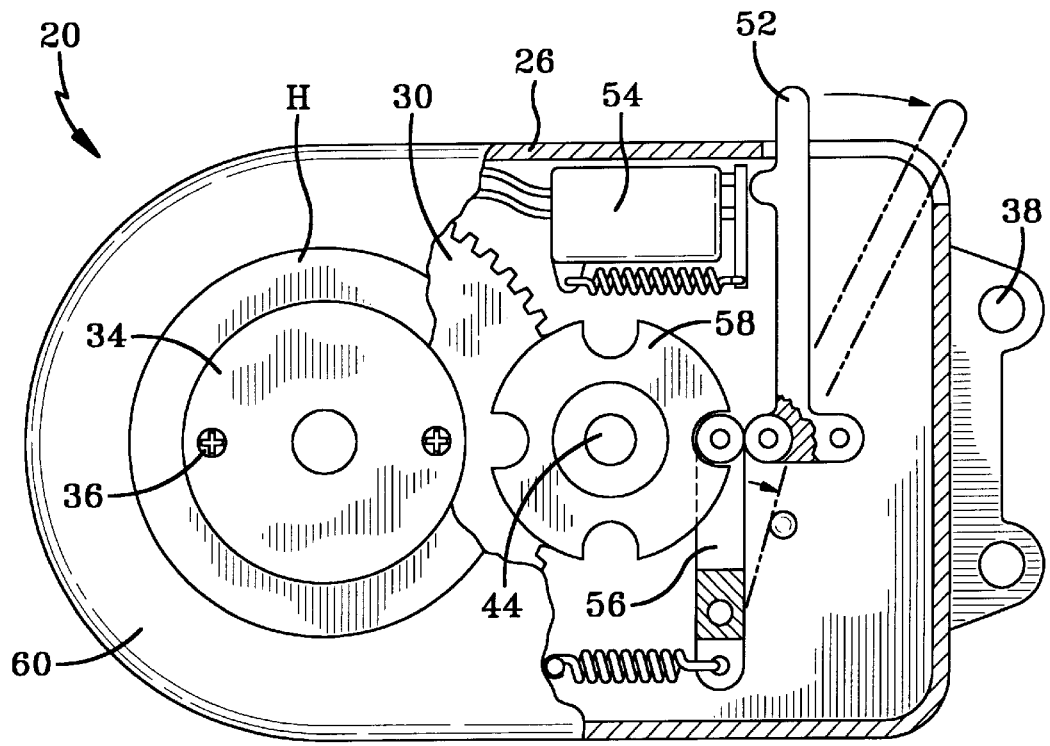
FIG. 3 is a top view of the spring motor power unit shown in FIG. 2.
Figure 4:
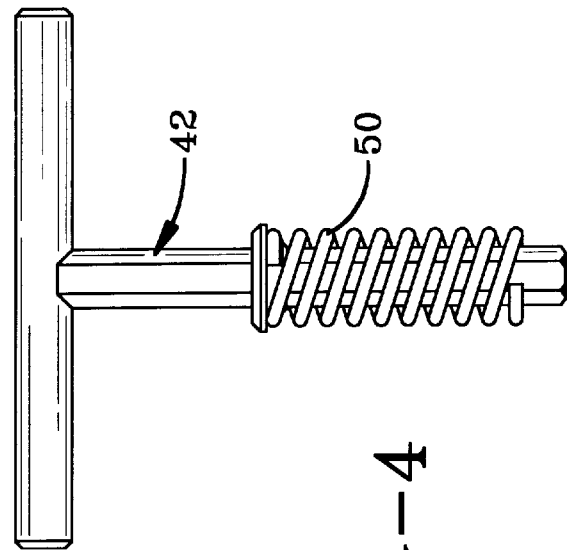
FIG. 4 is a front view of a T-handle hex key used in the preferred embodiment of the invention.

The following description discusses valve actuation in a supply line. However, the same applies for a drain line. While it is understood that an electric motor can also be used to regulate an existing valve cut-off or valve opening procedure, FIGS. 2, 3 and 4 show a ratchet type spring motor 20 for providing valve actuation. A power spring 22 is enclosed in a spring motor housing 24. Spring motor housing 24 is connected to a gear and trigger release housing 26. Gear and trigger release housing 26 contains a release solenoid 54, a release trigger 52, a release cam 58, a small or power gear 28 and a large gear 30. Spring motor 20 further includes a safety ratchet housing 48. Safety ratchet housing 48 encloses a ratchet assembly 46 and a power spring drive nut 47. The power spring drive nut 47 is affixed to a power spring drive bolt 44. Spring 22, release cam 58 that holds spring 22 in a loaded position, and power gear 28 for driving the large gear 30, are all mounted on bolt 44. A hex winding access 43 is formed by a cavity in the top surface of the power spring drive nut 47, as shown in FIG. 2. A spring winding T handle hex key 42, as shown in FIG.

4, is included for inserting into the hex winding access cavity 43 of the power spring drive nut 47. Rotation of T handle hex key 42 after inserting it into the hex winding access cavity 43 allows for the winding of the spring 22 into a loaded condition.

Valve V should be closed for installation (open for a drain valve) and power spring 22 should be in an unwound position. As shown in FIG. 2, a "Power Take Off" (PTO) point 32 of spring motor 20 is attached to the handle of an existing water or gas shut-off valve. This is accomplished by capturing the handle H with a plate 34, with two through put screws 36, and washers supplied with the unit (not shown). Plate 34 is secured to large gear 30 in the gear and trigger release housing 26. The attachment mechanism can also be adapted to a gate valve configuration.

Figure 5:
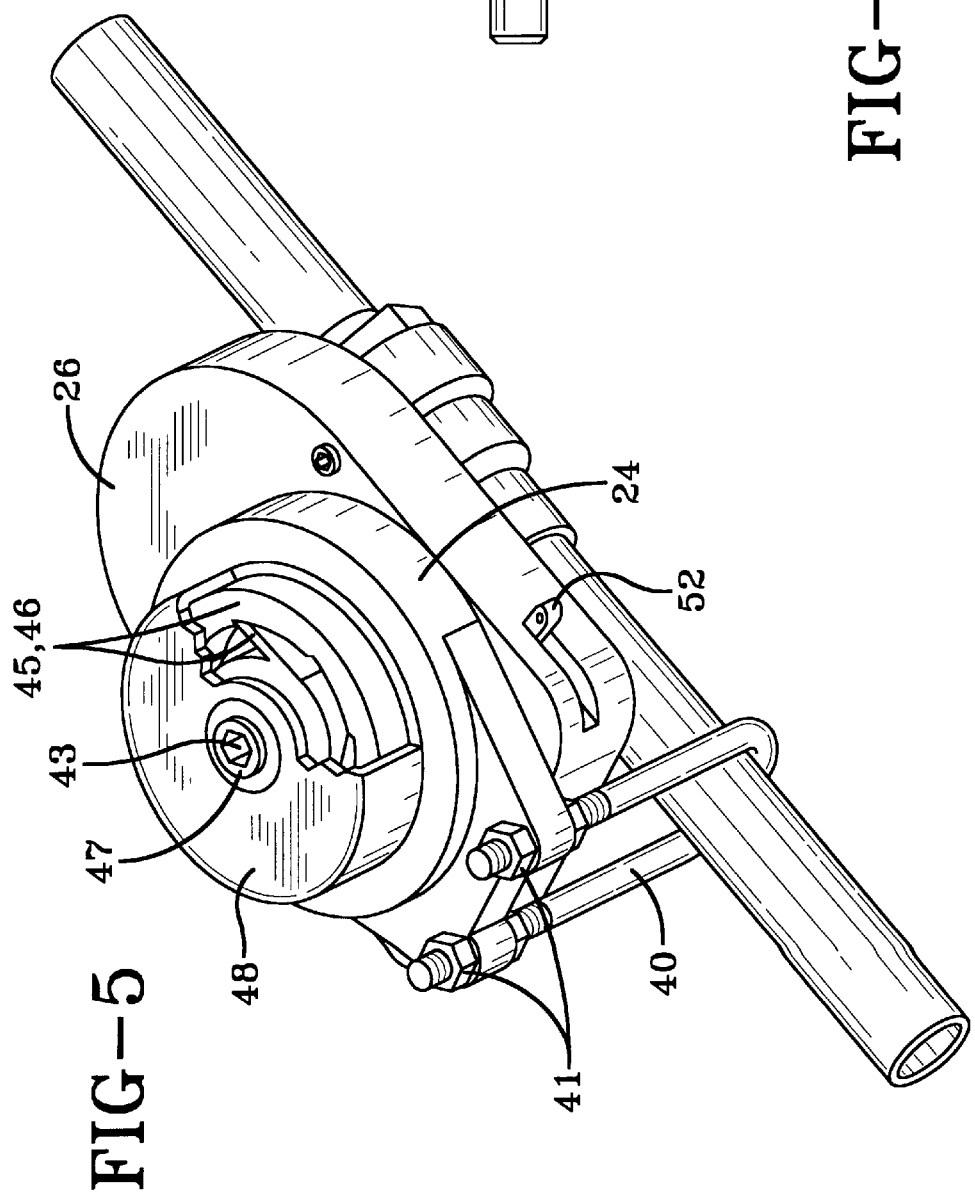
FIG. 5 is a top cut away view of the spring motor shown in FIG. 2 exposing a ratchet housing.

Referring to FIG. 5, the unit is secured in place by inserting a U-bolt 40 over the supply or drain lines, into U-bolt receiver holes 38, and then locked in place with hex nuts 41. Power spring 22 is wound to the loaded condition by inserting T-handle hex key 42 (see FIG. 4) into the mating hex key winding access cavity or socket 43 of the power spring drive bolt 44. Clockwise rotation of the key 42 drives the valve counterclockwise to the open position, and when fully open, a latch is set. The latch could have a "push button" format that is flush with the housing surface when the valve is open and will be extended with bright colored sides if the valve is closed.

As shown in FIG. 5, teeth 45 are fixed into a case 24 and spaced to allow some reverse motion to help in trigger setting. Safety ratchet assembly 46 contained in ratchet housing 48 protects key 42 from any reverse rotation, if the operator should accidentally lose grip when winding/loading power spring 22. Setting the latch releases the torsional forces on power spring 22, and a T-handle safety spring 50 pushes hex key 42 out of mating socket 43. Removal of hex key 42 prevents the unit from locking in the open position. A flexible sheet can be placed over the latch to prevent finger pinching when loading the spring.

With spring motor 20 mounted in place, a remote receiver 7 is mounted on a wall or nearby structure, and a power cable plugged into a mating socket. System performance is verified by activating any or all of the desired sensor locations. The system is now operational and will protect against water or gas hazards as previously described. The power spring unit can be manually tested for valve closure by pushing release trigger 52 in the opposite direction. The system has to be reset after each test. However, for critical situations, or simply for user convenience, a manual or electrical bypass prevents actuation of the spring motor even though the sensors may be sending a valid closure signal. This can also be accomplished by disconnecting the receiver plug-in.

Once armed and key 42 is removed, ratchet assembly 46 is no longer engaged and spring 22 is free to rotate for the closing motion when the hazard signal is received. Closure comes when an electromechanical device such as release solenoid 54 pushes release trigger 52, which in turn frees a release trigger roller arm 56 (shown in FIG. 3) allowing the release of cam 58 that holds spring 22 in the loaded position. Release of cam 58 causes rotational torque from spring 22 to be amplified as small power gear 28 rotates large gear 30. Motion in large gear 30 will close the valve. A torque amplification of almost six times is shown in FIG. 2. However, torque amplification could be even greater for stiffer gate valves, commonly used on gas lines.

Ratchet assembly 46 will not re-engage until key 42 is again inserted into mating socket or access hole 43, and drive nut 47 is engaged for rewinding spring 22. If spring motor 20 should fail in the open position, set-up key 42 can close the valve with counter-clockwise rotation. An audible alarm can be made to go off if spring 22 breaks in either position. The alarm will let the user know that the unit should be checked and repaired as soon as possible. Finally, if the trigger latch breaks, but the spring is operating properly, the valve can be held open by winding spring 22 and leaving key 42 in mating socket 43, wherein the torsional force from spring 22 will lock key 42 into the unit.

Figure 6:
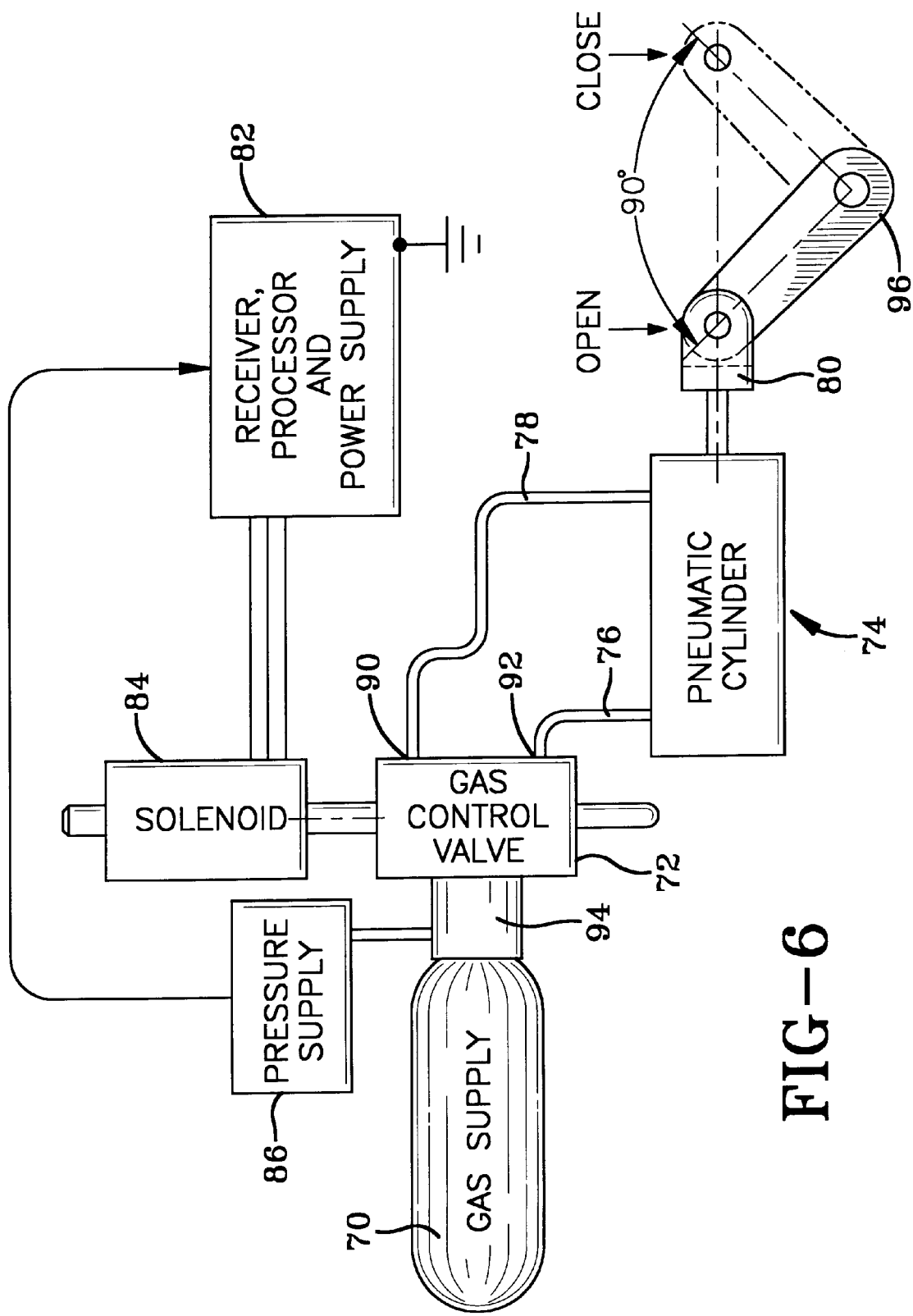
FIG. 6 is a view of a gas operated shut-off valve.
Figure 7:
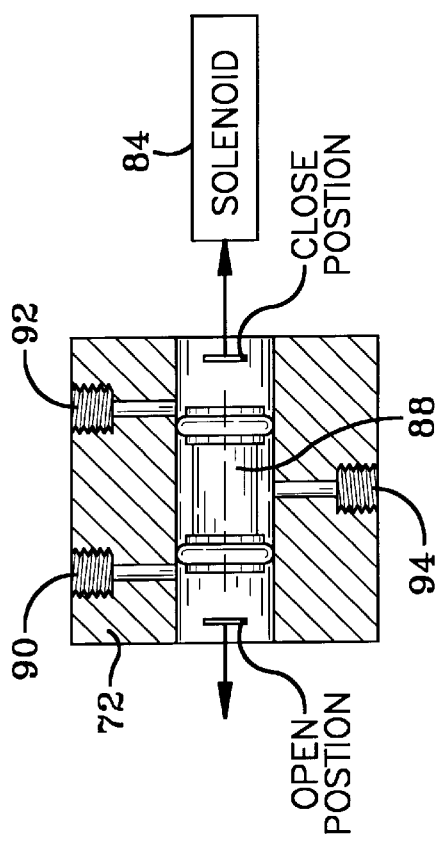
FIG. 7 is a detailed drawing of the gas control valve.

FIGS. 6 and 7 disclose a means for actuating the supply line or drain line valve with a source of pressurized gas. As with the spring motor system, a receiver, processor and power supply functions 82 control system operation. A supply 70 of pressurized gas interfaces with a gas control valve 72. FIG. 7 shows a piston 88 inside gas control valve 72 in the neutral position. Depending on the command from the received signal, a solenoid 84 will move piston 88 in one direction or the other causing gas control valve 72 to reverse the direction of movement on the piston in the pneumatic cylinder 74 to close or open the supply line valve. Thus, if supply gas is applied to an input port 94, solenoid 84 moves piston 88 to the left directing the pressure to an output port 92 and through a connecting line 76 to actuate pneumatic cylinder 74, rotating a valve arm 96 through a connecting rod 80 to close the valve. If solenoid 84 moves piston 88 to the right, gas pressure at output port 90 and a connecting tube 78 will reverse the direction of pneumatic cylinder 74 and open the valve.

Because this system relies on a pressurized gas supply, electrical power requirements would be very modest. Sensing and solenoid activation would be the only demands on the batteries or AC source. The solenoid is only actuated with every short pulse of power at the moment of valve closure or opening. The gas could be conveniently supplied by a standard $CO_2$ cylinder 70 and feeds directly into control valve 72, which in its neutral position blocks off the gas supply. A pressure sensor 86 monitors the supply pressure. As a safety procedure, a supply line closure and an audible alarm are actuated if the gas pressure drops below acceptable levels. Valve arm 96 is shown, but closure action could also come, for example, from a rack and pinion or cam roller. The pneumatic cylinder 74 could be made to move any number of mechanical interfacing devices to close any type of supply or drain line valve.

Figure 8:
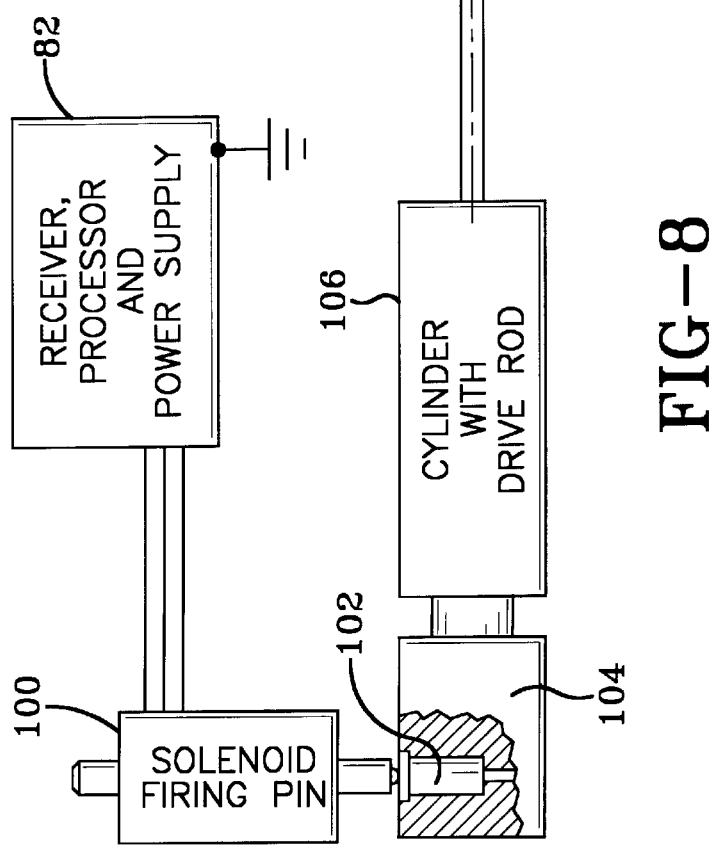
FIG. 8 is a drawing of an ignitable powder system.

FIG. 8 shows an embodiment for closing the supply line valve with a cartridge of ignitable powder 102 installed in cartridge chamber 104. The approach can also be made to open a drain line valve in the same manner as described for the spring motor. In either case, an actuation signal provides a short burst of power to a firing pin solenoid 100 that acts to ignite the powder in cartridge 102. The pressure developed by the burning powder drives the piston in drive cylinder 106 to the right in this figure. Piston motion will force drive rod 80 to the right and arm 96 will rotate to close the valve. This system is manually reloaded, and the valve should be opened before placing a new cartridge in the chamber 104. A 22 caliber cartridge is ideal for this application.

As can be seen from the description of the preferred embodiment, this system is not limited to structures or dwellings. For example, this system could be used to include lawn sprinkler installations. These types of systems often rely on "flood" type solenoids as a method for cutting the water supply. However, they are known to hang-up or jam open, often resulting in flooding. A moisture sensor with a variable, pre-selected, or an output level dependent on the degree of saturation, could be made to regulate (which includes to terminate) the flow rate accordingly. Because of the electrical nature of the system, the spring motor or solenoid could be used to cut the source, or a motor driven valve could be made to regulate the flow, and each of these would be actuated when pre-selected saturation triggers the transmitter. The RF design could be effective for closely arranged installations or those for vast areas such as golf courses, estates or the like, and would be especially useful if the rains come while the system is unattended.

The foregoing description is a specific embodiment of the present invention. It should be appreciated that this embodiment is described for the purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. Apparatus for regulating the flow of fluid through a supply line, the supply line having a valve for closing the supply line, said system comprising:
    a closure device for operating the valve to close the supply line in response to an electronic closure signal, said closure device comprising:
        ignitable powder means for applying a torque or force;
        gear means operatively connected to said ignitable powder means for amplifying the torque or force applied by said ignitable powder means to provide an amplified torque or force for operating the valve to close the supply line, said gear means having an open state for opening the valve and a closed state for closing the valve;
        attachment means operatively attaching said gear means to the valve;
        gear setting means for setting said gear means to the open state;
        releasable latching means for releasably holding said gear means in the open state; and
        trigger means for igniting said powder means in response to the electronic closure signal, for releasing said latching means, to cause said gear means to close the valve.

2. Apparatus for regulating the flow of water or gas through a supply line for a water or gas system in a building, the supply line having flow control means for controlling the flow of water or gas through the line, said apparatus comprising:
    at least one sensor for detecting the presence of water or gas outside of the supply line indicating a leak in the water or gas system;
    transmitting means electrically connected to said sensor for transmitting a transmission signal in response to the detection of water or gas by said sensor;
    receiver means remotely located from said sensor for transmitting a responsive signal in response to receiving the transmission signal;
    an actuator operatively connected to said receiver means and remotely located from said sensor means for generating an actuating signal in response to said responsive signal; and
    regulating means operatively to said actuator and to the flow control means for regulating the flow control means in response to said actuating signal to reduce the water or gas flowing in the supply line.

3. Apparatus according to claim 2 wherein said at least one flow line is a supply line and a drain line, and said at least one sensor consists of sensors for AC wall power, gas, temperature, fluid flow rate, ambient moisture, fluid pressure, and power source capacity.

4. Apparatus according to claim 2 having disabling means for disabling said actuator means from actuating said regulating means despite the detection of the parameter by said sensor means.

5. Apparatus according to claim 2 wherein the flow control means comprises shut-off valve means for shutting off flow in the supply line, and further including means for enabling flow of fluid through the supply line despite the detection of the presence of water or gas by said at least one sensor.

6. Apparatus according to claim 2 wherein said regulating means comprises a spring motor.

7. Apparatus according to claim 2 wherein said regulating means is a pressurized gas-operated regulator.

8. Apparatus according to claim 7 and further comprising a container means for containing said pressurized gas.

9. Apparatus according to claim 7 wherein the pressurized gas is $CO_2$, and said container means is a $CO_2$ cartridge.

10. Apparatus according to claim 2 wherein said regulating means is an ignitable powder-operated device, the ignition of the powder effecting actuation of said flow control means, and further including powder supply control means for controlling the amount of said powder to said ignitable powder-operated device in accordance with said responsive signal.

11. Apparatus according to claim 2 wherein said flow control means comprises a gear-down mechanism.

12. Apparatus according to claim 2 wherein said regulating means is non-intrusively connected to said flow control means.

13. Apparatus according to claim 2 wherein said flow control means is a valve, and said regulating means is a motor non-intrusively connected to said flow control means.

14. Apparatus according to claim 2 wherein said transmitting means transmits a coded transmission signal.

15. Apparatus according to claim 2 wherein said sensor detects at least two parameters, and said transmitter means transmits a different coded transmission signal for each of said parameters.

16. Apparatus according to claim 2 for use in a location having existing AC electrical lines, wherein said transmitting means transmits said transmission signal over said AC lines.

17. Apparatus according to claim 2 wherein said transmitter means transmits a coded light beam transmission signal.

18. Apparatus according to claim 2 wherein the fluid flow line comprises a pipe line, and said transmitting means transmits a coded, vibration transmission signal through the pipe line.

19. Apparatus according to claim 2 wherein said transmitting means transmits a coded, audible transmission signal.

20. Apparatus according to claim 2 wherein said transmitting means transmits a coded, ultrasonic transmission signal.

21. Apparatus according to claim 2 wherein said transmitting means has an activated state and a deactivated state, and is only able to transmit a transmission signal if said transmitting means is in said activated state, said transmitting means assuming said activated state only in response to said sensor means detecting said parameter.

22. Apparatus according to claim 2 wherein said transmitting means periodically generates a test signal to determine if said system is operating properly, and said receiver means generates the malfunction signal in the event it does not receive the periodic test signal, and wherein said system further comprises warning signal means for generating a warning signal in response to a malfunction signal.

23. Apparatus according to claim 2 and further comprising sender power means for providing electric power to said sensor means.

24. Apparatus according to claim 23 wherein said battery is rechargeable.

25. Apparatus according to claim 23 wherein said sender power means comprises a storage capacitor.

26. Apparatus according to claim 25 wherein said storage power means is rechargeable.

27. Apparatus according to claim 23 wherein said sender power means is solar charged.

28. Apparatus according to claim 23 and further including low power warning means for generating a warning signal if said sender power is unable to provide a predetermined amount of electric power.

29. Apparatus according to claim 28 wherein the warning signal generated by said low power warning means is a visual warning signal.

30. Apparatus according to claim 23 wherein said sender power means comprises a battery.

31. Apparatus according to claim 2 and further comprising malfunction warning means operatively connected to said regulating means for generating a malfunction warning signal in response to the malfunction of said regulating means.

32. Apparatus according to claim 2 wherein said regulating means is a spring motor, and said system further comprises malfunction warning means operatively connected to said spring motor for generating a malfunction warning signal in response to the breakage of the spring in said spring motor.

33. Apparatus according to claim 2 and further comprising supplemental actuating means for actuating said regulating means in the event said actuating means fails to control said regulating means for a predetermined period of time after said sensor means detects the parameter.

34. Apparatus according to claim 2 and further comprising sensor indicating means for indicating the identity of said sensor means having detected the parameter.

35. Apparatus according to claim 2 wherein the flow control means is a shut-off valve means for shutting off said supply line, and wherein said at least one sensor comprises at least two sensors, further including sensor-indicating means for indicating the identity of said sensors having detected the presence of water or gas.

36. Apparatus according to claim 2 wherein said transmitter means transmits said transmission signals at predetermined intervals to save energy.

37. Apparatus according to claim 2 wherein the flow control means is at a control location in the fluid flow line, and further comprising sender power means comprising an AC power source at the control location.

38. Apparatus according to claim 2 and further comprising receiver power means for supplying electric power to said receiver means.

39. Apparatus according to claim 38 wherein said receiver power means is selected from the group consisting of a battery and an energy storage capacitor.

40. Apparatus according to claim 2 wherein the flow control is at a control location in the fluid flow line, and further comprising receiver power means, said receiver power means comprising an AC power source at the control location.

41. Apparatus according to claim 2 and further comprising receiver power means for supplying electric power to said receiving means, wherein said receiving means has an activated state and a deactivated state, and is only able to transmit a responsive signal if said receiving means is in said activated state, said receiving means assuming said activated state periodically to be supplied with power from said receiver power means.

42. Apparatus according to claim 2 and further comprising manual operating means for manually operating the flow control means.

43. Apparatus according to claim 2 and further comprising sensor override means for bypassing or overriding said sensor means and operating the flow control means.

44. Apparatus according to claim 2 wherein said regulating means is non-electrical.

45. Apparatus according to claim 2 wherein said regulating means is an electromechanical apparatus.

46. Apparatus according to claim 2 wherein said regulating means is an electric motor.

47. Apparatus according to claim 2, wherein the flow control means include a valve for closing the supply line, said regulating means comprising:
  a closure device for operating the valve to close the supply line in response to said actuating signal, said closure device comprising:
    at least one spring for applying a torque or force;
    gear means operatively connected to said spring for amplifying the torque or force applied by said spring to provide an amplified torque or force for operating the valve to close the supply line;
    attachment means operatively attaching said gear means to the valve;
    winding means for winding said spring to a wound state to store the torque or force energy in said spring;
    locking means for releasably locking said spring in the wound state; and
    electrically actuable trigger means for releasing said locking means in response to reception of said actuating signal, to cause said gear means to close the valve.

48. Apparatus according to claim 47 wherein said gear means comprises a power gear operatively attached to said spring, and a large gear larger than said power gear engaged with said power gear and connected to said attachment means.

49. Apparatus according to claim 47 wherein said attachment means comprises a plate attached to said gear means and to the valve.

50. Apparatus according to claim 47 wherein said winding means comprises:
  a power spring drive nut having a cavity defining a key winding access hole;
  a power spring drive bolt attached to said power spring drive nut and said spring;
  a ratchet assembly attached to said drive bolt and to said drive nut; and
  a key for matingly engaging said key winding access hole, said key entering and being rotated in said key winding access hold winds said spring.

51. Apparatus according to claim 47 and further comprising release and reset trigger means for releasably locking said spring in the wound state, and releasing said spring from the wound state.

52. Apparatus for regulating the flow of fluid through a supply line according to claim 2, wherein the supply line has a valve for closing the supply line, said regulating means comprising:
- a closure device for operating the valve to close the supply line in response to said actuating signal, said closure means comprising:
  - pressurized gas means holding pressurized gas, and release means for releasing the pressurized gas to provide a torque or force;
  - attachment means operatively attaching said gas means to the valve; and
  - trigger means for actuating said release means in response to said actuating signal to close the valve.

53. Apparatus according to claim 52 and further comprising gear means operatively connected to said pressurized gas means and to the valve for amplifying the torque or force from said pressurized gas means to provide an amplified torque or force for operating the valve to close the supply line.

54. Apparatus for regulating the flow of fluid through a supply line according to claim 2, wherein the supply line has a valve for closing the supply line, said system comprising:
- a closure device for operating the valve to close the supply line in response to said actuating signal, said closure device comprising:
  - spring means for applying a torque or force for operating the valve to close the supply line;
  - winding means for winding said spring means to a wound state to store the torque or force energy in said spring means;
  - cam means for releasably locking said spring means in the wound state;
  - trigger means actuable for operating said cam means to release said spring means to operate the valve; and
  - a release solenoid for receiving said actuating signal and actuating said trigger means in response to said actuating signal.

55. Apparatus according to claim 54 and further comprising gear means operatively connected to said spring for amplifying the torque or force applied by said spring to provide an amplified torque or force for closing the valve to close the supply line; and
- attachment means operatively attaching said gear means to the valve.

56. A system according to claim 55 wherein said gear means comprises a power gear operatively attached to said spring, and a large gear larger than said power gear engaged with said power gear and connected to said attachment means.

57. Apparatus according to claim 55 wherein said attachment means comprises a plate attached to said gear means and to the valve.

58. A system according to claim 55 wherein said winding means comprises:
- a power spring drive nut having a cavity defining a key winding access hole;
- a power spring drive bolt attached to said power spring drive nut and said spring;
- a ratchet assembly attached to said drive bolt and to said drive nut; and
- a key for matingly engaging said key winding access hole, said key entering and being rotated in said key winding access hole winds said spring means.

59. A system according to claim 55 and further comprising release and reset trigger means for releasably locking said spring in the wound state, and releasing said spring from the wound state.

60. Apparatus according to claim 2 wherein the flow control means is a supply line valve, and said regulating means adjusts the supply line valve for reducing the flow in the supply line.

61. Apparatus according to claim 2 wherein the building also has a drain line, and said flow control means further comprises an opening device for opening the drain line, and wherein said regulating means operates the opening device to open the drain in response to said actuating signal.

* * * * *